US008444383B1

(12) United States Patent
Baker

(10) Patent No.: US 8,444,383 B1
(45) Date of Patent: May 21, 2013

(54) WIND TURBINE WITH INTERNAL RAM AIR TURBINE

(76) Inventor: Glenn James Baker, Rawlins, WY (US)

( * ) Notice: Subject to any disclaimer, the term of this patent is extended or adjusted under 35 U.S.C. 154(b) by 536 days.

(21) Appl. No.: 12/802,010

(22) Filed: May 27, 2010

Related U.S. Application Data

(60) Provisional application No. 61/217,270, filed on May 29, 2009.

(51) Int. Cl.
B63H 11/00 (2006.01)
B64C 15/02 (2006.01)
B64C 27/18 (2006.01)

(52) U.S. Cl.
USPC ......... 416/20 R; 416/90 A; 416/91; 416/93 R

(58) Field of Classification Search
USPC .............. 416/20 R, 90 A, 90 R, 91, 92, 93 A, 416/93 R, 94, 134 A, 128; 415/175, 176, 415/115; 290/43, 44, 54, 55
See application file for complete search history.

(56) References Cited

U.S. PATENT DOCUMENTS 7,354,247 B2 * 4/2008 Bonnet ....................... 416/90 R

* cited by examiner

Primary Examiner — Edward Look
Assistant Examiner — Christopher C Williams
(74) Attorney, Agent, or Firm — Ramon L. Pizarro; Edwin H. Crabtree

(57) ABSTRACT

A wind turbine blade system that includes blades with an internal airflow path that extends within the blade from a location at the tip of the blade to a location near the base or root of the blade. A ram air turbine positioned inside each of the blades, along the airflow path, the ram air turbine being adapted for generate electricity, and thus the current output may then be connected to an electric load, so that air is ingested at the tip of the blade as each blade rotates.

1 Claim, 1 Drawing Sheet

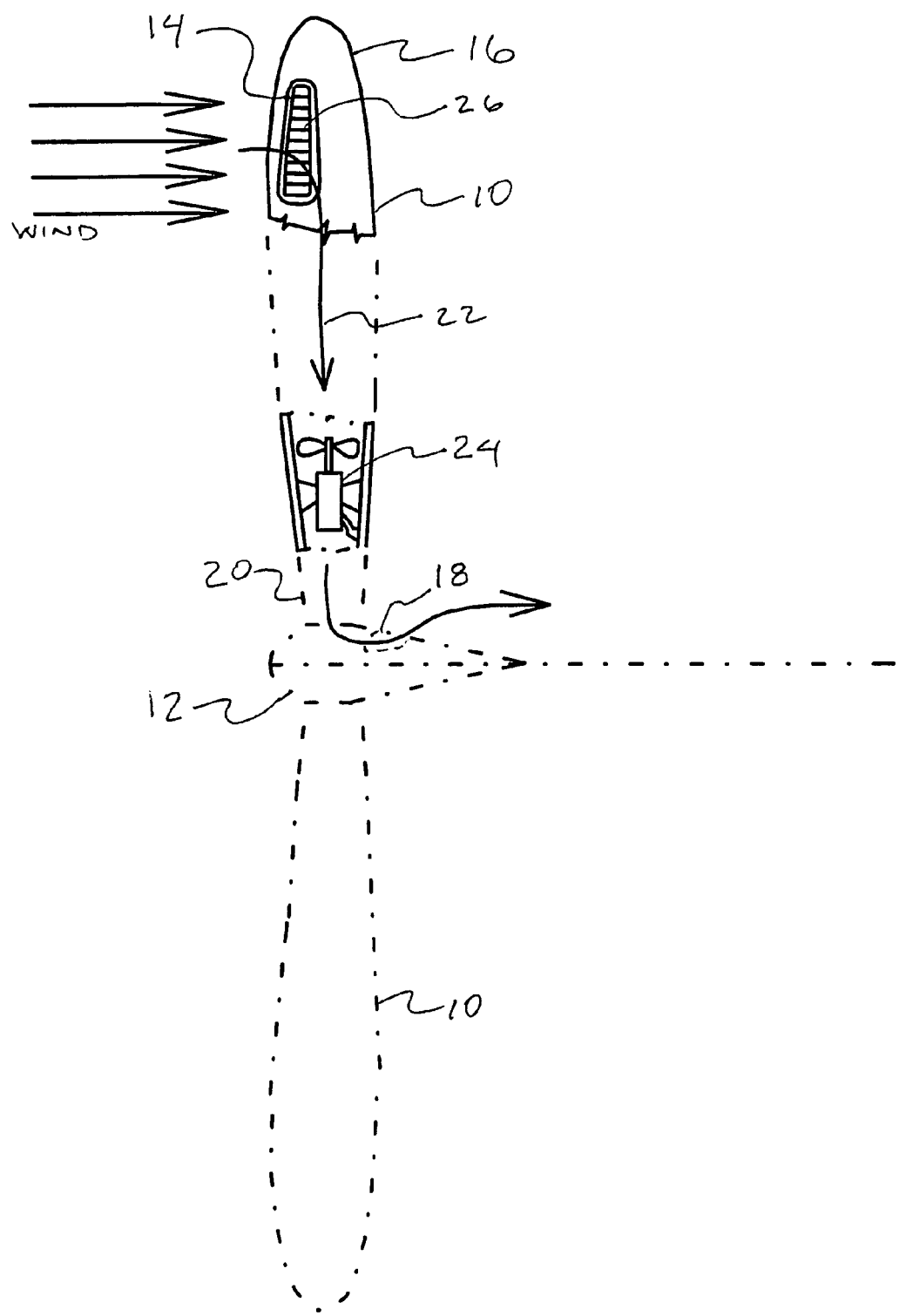

WIND TURBINE WITH INTERNAL RAM AIR TURBINE

REFERENCE TO RELATED APPLICATIONS

This application claims the benefit of my provisional application titled "WIND TURBINE WITH INTERNAL RAM AIR TURBINE" having Ser. No. 61/217,270, filed May 29, 2009.

BACKGROUND OF THE INVENTION (a) Field of the Invention

This application relates to a system and method for controlling the speed of the blades of a wind turbine. More particularly, but not by way of limitation, to a wind turbine that includes blades that capture air as the blades rotate, and use this air to operate ram air turbines that assist in slowing the speed of the blades, while generating electrical power.

(b) Discussion of Known Art

Current trend in the design of wind power turbines for generation of electricity is towards longer blades. This allows a greater amount of torque to be applied at a lower wind speed but it does have several drawbacks inherent to the concept. Longer blades require taller towers which in turn require stronger materials and better base preparations. Such tall towers are limited in geographic locations where they can be placed due to soil conditions, etc. without much greater added expense. Once the taller tower is installed the problems are not over as the longer blades are more wind sensitive. Higher wind speeds are required for start up yet the long blades must be shut down at much lower wind speeds than shorter blades. The operating wind speed range is considerably narrower than a similar unit running shorter blades. The same longer blade that increases torque now works against the system by increased blade tip speed.

Picture two typical three-blade props from the front. The prop on the left is running 50-foot blades while the prop on the right is running 100 foot blades. Both props are turning at the same shaft speed but the tip speed at the circumference of their arc is much greater on the longer blades. Once the tip speed exceeds the speed of sound the blades both loose effectiveness and become very unstable. While factors such as temperature and humidity influence the actual performance, the tip speed cannot exceed 1130 feet per second. The typical systems in use today are forced to shut down at wind speeds that exceed this limit.

SUMMARY

It has been discovered that the problems left unanswered by known art can be solved by providing a wind turbine blade system that includes:

At least two hollow blades, each blade having a tip and a root, each blade being adapted for rotating about an axis near the root of the blade;

An air intake at the tip of each of the blades and an air outlet that is located near the root of each of the blades, and an airflow path that extends within the blade from the air intake the air outlet; and a ram air turbine positioned inside each of the blades, along the airflow path, the ram air turbine being adapted for generating electricity, and thus the current output may then be connected to an electric load, so that air is ingested at the tip of the blade as each blade rotates, and so that the air ingested is used to drive each respective ram air turbine, and so that electricity generated by each ram air turbine may be used to power a load that serves to control the rotational speed of the turbine blades or to power other systems used to control the turbine or to generate power for general use.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a layout of a wind turbine incorporating inventive aspects disclosed here.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIG. 1 which illustrates an embodiment of the disclosed invention, where the propeller blades 10 of each turbine 12 are hollow, and include an air intake 14 at or near the tip 16 of each blade 10 and an air outlet 18 is located near the root 20 of the blade, and an airflow path 22 extending between the air intake and the air outlet. A ram air turbine (RAT) 24 is positioned inside each of the blades, along the airflow path 22 to harness the airflow moving between the intake 14 and the outlet 18. The RAT 24 would be used to generate electricity, and thus the current output may then be connected to an electric load. It is contemplated that the placement of the intake 14 would allow the turbine to continue to operate beyond the current wind speeds by selectively increasing the amount of torque required to turn the blades. Rather than limit the power produced the force is simply redirected and continues to produce power while limiting tip speed. By using a series of variable pitch vents 26 located near the tips 16 of the longer blades, these vents would be opened as necessary and would act as scoops slowing tip speeds. These scoops would then direct the high-pressure air down the length of the blade and through stationary wind turbines mounted within each blade to produce additional power. The turbines could be connected directly to generator/alternator systems or could be utilized to produce pneumatic or hydraulic pressure and directed for use elsewhere.

I claim:

1. A wind turbine blade system comprises:
at least two hollow blades, each blade having a tip and a root, each blade being adapted for rotating about an axis near the root of the blade, each blade further comprising:

an air intake at the tip of the blade and an air outlet that is located near the root of the blade, and an airflow path that extends within the blade from the air intake to the air outlet;

a ram air turbine positioned inside each of the blades, along the airflow path, the ram air turbine being adapted for generating electricity, and thus the current output may then be connected to an electric load, so that air is ingested at the tip of the blade as each blade rotates, and so that the air ingested is used to drive each respective ram air turbine, and so that electricity generated by each ram air turbine may be used to control the speed of the blades.

\* \* \* \* \*